(12) United States Patent
Kim et al.

(10) Patent No.: US 12,092,849 B2
(45) Date of Patent: Sep. 17, 2024

(54) POLARIZING PLATE

(71) Applicant: Shanjin Optoelectronics (Suzhou) Co., Ltd., Jiangsu (CN)

(72) Inventors: Tae Woo Kim, Daejeon (KR); Gae Sung Kim, Daejeon (KR); Hyun Soo Lee, Daejeon (KR); Khyung Sik Cho, Daejeon (KR); Jin Yong Park, Daejeon (KR); Sang Hyun Nah, Daejeon (KR)

(73) Assignee: Shanjin Optoelectronics (Suzhou) Co., Ltd. (CN)

( * ) Notice: Subject to any disclaimer, the term of this patent is extended or adjusted under 35 U.S.C. 154(b) by 767 days.

(21) Appl. No.: 17/287,310

(22) PCT Filed: Jan. 10, 2020

(86) PCT No.: PCT/KR2020/000450
§ 371 (c)(1),
(2) Date: Apr. 21, 2021

(87) PCT Pub. No.: WO2020/145712
PCT Pub. Date: Jul. 16, 2020

(65) Prior Publication Data
US 2021/0356640 A1    Nov. 18, 2021

(30) Foreign Application Priority Data
Jan. 11, 2019  (KR) .................. 10-2019-0003686

(51) Int. Cl.
*G02B 5/30* (2006.01)
*G02B 1/14* (2015.01)
*G02F 1/1335* (2006.01)

(52) U.S. Cl.
CPC .............. *G02B 5/305* (2013.01); *G02B 1/14* (2015.01); *G02F 1/133531* (2021.01)

(58) Field of Classification Search
CPC ........ G02B 5/305; G02B 5/3033; G02B 5/30; G02B 5/3041; G02B 1/14; G02B 1/10;
(Continued)

(56) References Cited

U.S. PATENT DOCUMENTS 9,995,863 B2 * 6/2018 Shin ...................... G02B 5/3033
11,760,078 B2 * 9/2023 Lee ......................... B32B 37/12
156/84
(Continued)

FOREIGN PATENT DOCUMENTS

CN    104749815 A    7/2015
CN    105388554 A    3/2016
(Continued)

OTHER PUBLICATIONS

Komatsu Keishi,JP 2013-122530 A, English Language Machine Translation, generated Feb. 24, 2024 (Year: 2013).*
(Continued)

*Primary Examiner* — Stephone B Allen
*Assistant Examiner* — Adam W Booher

(57) ABSTRACT

The present application relates to a polarizing plate. The present application can provide a polarizing plate having excellent optical and mechanical durability even when it is formed in a thin thickness or is applied to a thin display device and without causing bending or twisting when applied to a display device.

15 Claims, 1 Drawing Sheet

(58) Field of Classification Search
CPC ......... G02F 1/133531; G02F 1/133528; G02F 1/1335
See application file for complete search history.

(56) References Cited

U.S. PATENT DOCUMENTS

| | | | | |
|---|---|---|---|---|
| 2015/0168779 | A1* | 6/2015 | Kim | G02F 1/133528 349/96 |
| 2015/0276992 | A1* | 10/2015 | Park | G02B 1/14 428/212 |
| 2016/0025909 | A1 | 1/2016 | Yeo | |
| 2020/0355961 | A1* | 11/2020 | Song | G02B 1/11 |

FOREIGN PATENT DOCUMENTS

| | | | |
|---|---|---|---|
| CN | 106461843 | A | 2/2017 |
| CN | 109073804 | A | 12/2018 |
| JP | H104292937 | A | 10/1992 |
| JP | 2003207620 | A | 7/2003 |
| JP | 2005292646 | A | 10/2005 |
| JP | 2013122530 | A | 6/2013 |
| JP | 2015222368 | A | 12/2015 |
| JP | 2016504632 | A | 2/2016 |
| JP | 2017223940 | A | 12/2017 |
| KR | 20150072993 | A | 6/2015 |
| KR | 10-2017-0012280 | A | 2/2017 |
| KR | 10-2017-0104966 | A | 9/2017 |
| KR | 10-2017-0121522 | A | 11/2017 |
| KR | 10-2018-0124974 | A | 11/2018 |
| TW | 201734515 | A | 10/2017 |
| WO | 2014109489 | A1 | 7/2014 |
| WO | 2015166941 | A1 | 11/2015 |
| WO | WO-2017170216 | A1 * | 10/2017 ............... G02B 1/14 |
| WO | 2019054406 | A1 | 3/2019 |

OTHER PUBLICATIONS

Kitagawa et al., KR 2017-0012280 A, English Language Machine Translation, generated Feb. 24, 2024 (Year: 2017).*

1st OA by China National IPA, dated Jul. 27, 2022, whole translation.

Decision of Rejection by JPO, dated Jan. 4, 2023, whole translation.

* cited by examiner

| 11 |
|----|
| 12 |
| 13 |

POLARIZING PLATE

TECHNICAL FIELD

This application is a National Stage Entry of International Application No. PCT/KR2020/000450, filed Jan. 10, 2020, and claims the benefit of Korean Application No. 10-2019-0003686, filed on Jan. 11, 2019 all of which are hereby incorporated by reference in their entirety for all purposes as if fully set forth herein.

The present application relates to a polarizing plate and a display device.

BACKGROUND ART

Polarizing plates are optical films applied to control light states in various display devices. Usually, the polarizing plate is produced by attaching a protective film to one side or both sides of a polarizing film with a polarizing function.

Since the polarizing plate is exposed to various temperature and humidity conditions depending on the use environment of the display device, it requires durability. For example, the polarizing plate should stably maintain the designed optical properties according to the external environment such as temperature and humidity, and should not cause mechanical defects such as cracks.

Recently, as the demand for thinner display devices increases, there is also a demand for thin polarizing plates that do not cause bending and twisting. Since the polarizing film or other components included in the polarizing plate are usually produced through a stretching process, they tend to generate stress depending on external temperature and humidity. Such stress can cause bending and/or twisting in thin display devices, and such bending and/or twisting can adversely affect the performance of the display devices.

However, recently, the polarizing plate having a thin thickness is also gradually preferred and the size of the polarizing plate or the direction of its light absorption axis is also different depending on the applied use, so that it is a difficult task that the bending and twisting can also be prevented while giving the mechanical and optical durability to all the polarizing plates.

DISCLOSURE

Technical Problem

The present application provides a polarizing plate and a display device.

Technical Solution

In this specification, the term such as vertical, horizontal, orthogonal or parallel among terms defining an angle means substantially vertical, horizontal, orthogonal or parallel in the range without impairing intended effects, and the range of vertical, horizontal, orthogonal or parallel includes an error such as a production error or a deviation (variation). For example, each case of the foregoing may include an error within about ±15 degrees, an error within about ±10 degrees or an error within about ±5 degrees.

Among physical properties referred to herein, when the measured temperature affects relevant physical properties, the physical properties are physical properties measured at room temperature, unless otherwise specified.

In this specification, the term room temperature is a temperature in a state without particularly warming or cooling, which may mean one temperature in a range of about 10° C. to 30° C., for example, a temperature of about 15° C. or higher, 18° C. or higher, 20° C. or higher, or about 23° C. or higher, and about 27° C. or lower. Unless otherwise specified, the unit of the temperature mentioned herein is ° C.

Among physical properties referred to herein, when the measured pressure affects relevant physical properties, the physical properties are physical properties measured at normal pressure, unless otherwise specified.

In this specification, the term normal pressure is a natural pressure without particularly pressurizing or depressurizing, which usually means a pressure of about 1 atm or so, such as atmospheric pressure.

Among physical properties referred to herein, when the measured humidity affects relevant physical properties, the physical properties are physical properties measured at any one humidity in a range of about 0 RH % to 100 RH %, for example, relative humidity of about 90 RH % or less, about 80 RH % or less, about 70 RH % or less, about 60 RH % or less, about 50 RH % or less, about 40 RH % or less, about 30 RH % or less, about 20 RH % or less, about 18 RH % or less, about 15 RH % or less, or about 10 RH % or less, or about 1 RH % or more, about 2 RH % or more, about 5 RH % or more, about 10 RH % or more, about 15 RH % or more, about 20 RH % or more, about 25 RH % or more, about 30 RH % or more, about 35 RH % or more, about 40 RH % or more, or about 45 RH % or more, unless otherwise specified. Here, the unit RH % means that the relevant humidity is the relative humidity (unit: %).

Unless otherwise specified, the angle formed by any two directions, which is mentioned herein, may be an acute angle of acute angles to obtuse angles formed by the two directions, or may be a small angle from angles measured in clockwise and counterclockwise directions. Thus, unless otherwise specified, the angles mentioned herein are positive. However, in order to display the measurement direction between the angles measured in the clockwise direction or the counterclockwise direction if necessary, the angle measured in the clockwise direction may be represented as a positive number, and the angle measured in the counterclockwise direction may be represented as a negative number.

The present application relates to a polarizing plate. In this specification, the terms polarizing film and polarizing plate have different meanings. The term polarizing film means a functional element itself exhibiting a polarizing function, such as, for example, a PVA (poly(vinyl alcohol))-based film in which an anisotropic substance such as iodine is adsorbed and oriented, and the polarizing plate means an element comprising other elements together with the polarizing film. Here, other elements included together with the polarizing film can be exemplified by a polarizing film protective film, an antistatic layer, a viewing angle compensating film, a hard coating layer, a phase difference film, an adhesive layer, a pressure-sensitive adhesive layer or a low reflection layer, and the like, but is not limited thereto.

The polarizing plate of the present application may be applied to various applications to exhibit excellent performance.

In one example, the polarizing plate of the present application may have a quadrangular shape such as a square or a rectangle, wherein the ratio (W/L) of the width (W) to the length (L) may be in a range of 1.6 to 2. In this case, in another example, the ratio (W/L) may be about 1.65 or more, about 1.7 or more, or about 1.75 or more, or may also be about 1.95 or less, about 1.9 or less, about 1.85 or less, or about 1.8 or less.

In another example, the polarizing plate of the present application may have a quadrangular shape such as a square or a rectangle, wherein the ratio (W/L) of the width (W) to the length (L) may be in a range of 1 to 1.6. In this case, in another example, the ratio (W/L) may be about 1.05 or more, about 1.1 or more, about 1.15 or more, about 1.2 or more, about 1.25 or more, or about 1.3 or more, or may also be about 1.55 or less, about 1.5 or less, about 1.45 or less, about 1.4 or less, or about 1.35 or less.

The size of the polarizing plate is a value determined by the specs of the display device to which the polarizing plate is applied, for example, the screen ratio. The polarizing plate of the present application may exhibit the desired excellent performance regardless of the applied screen ratio of the polarizing plate.

The polarizing plate is formed in different directions depending on the applied use, for example, the mode of the display panel or the like. Since the polarizing film in the polarizing plate generally causes contraction or the like along the direction where the light absorption axis is formed, the formation direction of the light absorption axis is also considered in the optical or mechanical durability of the polarizing plate or in suppressing bending or twisting of the display device to which the polarizing plate is applied. The polarizing plate of the present application shows excellent performance regardless of the formation direction of the light absorption axis.

For example, the small angle of the angles formed by one side of the polarizing film in the polarizing plate or the polarizing plate and the light absorption axis of the polarizing film may be in a range of 0 degrees to 10 degrees or in a range of 80 degrees to 100 degrees. In another example, the angle may be 9 degrees or less, 8 degrees or less, 7 degrees or less, 6 degrees or less, 5 degrees or less, 4 degrees or less, 3 degrees or less, 2 degrees or less, or 1 degree or less. Furthermore, in another example, the angle may be about 81 degrees or more, 82 degrees or more, 83 degrees or more, 84 degrees or more, 85 degrees or more, 86 degrees or more, 87 degrees or more, 88 degrees or more, 89 degrees or more, or 90 degrees or more, or may also be 99 degrees or less, 98 degrees or less, 97 degrees or less, 96 degrees or less, 95 degrees or less, 94 degrees or less, 93 degrees or less, 92 degrees or less, 91 degrees or less, or about 90 degrees or less or so.

In another example, the small angle of the angles formed by one side of the polarizing film in the polarizing plate or the polarizing plate and the light absorption axis of the polarizing film may be in the range of 35 degrees to 55 degrees or in the range of 125 degrees to 145 degrees.

In another example, the angle may be about 36 degrees or more or so, 37 degrees or more or so, 38 degrees or more or so, 39 degrees or more or so, 40 degrees or more or so, 41 degrees or more or so, 42 degrees or more or so, 43 degrees or more or so, 44 degrees or more or so, or 45 degrees or more or so, or may be 54 degrees or less or so, 53 degrees or less or so, 52 degrees or less or so, 51 degrees or less or so, 50 degrees or less or so, 49 degrees or less or so, 48 degrees or less or so, 47 degrees or less or so, 46 degrees or less or so, or 45 degrees or less or so, and furthermore, may be about 126 degrees or more or so, 127 degrees or more or so, 128 degrees or more or so, 129 degrees or more or so, 130 degrees or more or so, 131 degrees or more or so, 132 degrees or more or so, 133 degrees or more or so, 134 degrees or more or so, or 135 degrees or more or so, or may be 144 degrees or less or so, 143 degrees or less, 142 degrees or less or so, 141 degrees or less or so, 140 degrees or less or so, 139 degrees or less or so, 138 degrees or less or so, 137 degrees or less or so, 136 degrees or less or so, or 135 degrees or less or so.

Usually, the polarizing film and the polarizing plate may have a quadrangle such as a square or a rectangle, and one side of the polarizing film or the polarizing plate forming the angle with the light absorption axis may be any one side of the quadrangle. For example, if the quadrangle is a rectangle, the one side may be a long side or a short side of the rectangle.

The polarizing plate of the present application can exhibit desired excellent effects even when formed in the thin thickness. For example, the polarizing plate may have a total thickness of 200 μm or less. The polarizing plate may comprise various elements as described above, but the final thickness may be limited within the range. By designing the thickness of the polarizing plate to 200 μm or less, it can cope effectively with various applications for which the thin thickness is required. Usually, on a polarizing plate, a pressure-sensitive adhesive layer for applying the polarizing plate to a display device is formed, and in order to protect the pressure-sensitive adhesive layer, optionally, a release film is attached to the pressure-sensitive adhesive layer or a release surface-protective sheet is temporarily attached to the outermost side of the polarizing plate. The thickness of 200 μm or less mentioned in the present application is a thickness excluding portions finally removed when the polarizing plate is applied to a display, such as the release film or the surface-protective sheet. In another example, the thickness may be about 195 μm or less, about 190 μm or less, about 185 μm or less, about 180 μm or less, about 175 μm or less, about 170 μm or less, about 165 μm or less, about 160 μm or less, about 155 μm or less, about 150 μm or less, about 145 μm or less, or about 140 μm or less or so. The lower limit of the thickness of the polarizing plate is not particularly limited, but it may generally be about 50 μm or more, 60 μm or more, 70 μm or more, 80 μm or more, 90 μm or more, 100 μm or more, 110 μm or more, or 120 μm or more or so.

The thickness referred to herein may mean the shortest distance, the maximum distance or the average distance connecting the major surface of the target article to the main back, where there may also be manufacturing errors or deviations of a certain portion.

The polarizing plate of the present application may basically comprise a polarizing film, a protective film and a pressure-sensitive adhesive layer. The above structures may be arranged in the order of a protective film, a polarizing film and a pressure-sensitive adhesive layer. FIG. 1 schematically shows such a structure. As in FIG. 1, the polarizing plate may comprise a protective film (11) formed on one side of the polarizing film (12) and a pressure-sensitive adhesive layer (13) formed on the other side of the polarizing film (12).

In such a structure of the present application, a ratio ($S_P/S_V$) of the shrinkage force ($S_P$) of the entire polarizing plate in the light absorption axis direction and the shrinkage force ($S_V$) of the entire polarizing plate in the direction perpendicular to the light absorption axis direction may be in a range of 0.9 to 1.5. Here, the shrinkage force is a value measured by the method shown in an example of this specification. In another example, the ratio ($S_P/S_V$) may be about 0.91 or more, about 0.92 or more, about 0.93 or more, about 0.94 or more, about 0.95 or more, about 0.96 or more, or about 0.97 or more, or may be about 1.49 or less, about 1.48 or less, about 1.47 or less, about 1.46 or less, about 1.45 or less, about 1.44 or less, about 1.43 or less, about 1.42 or less, about 1.41 or less, about 1.4 or less, about 1.39 or less, about 1.38 or less, about 1.37 or less, about 1.36 or less, about 1.35 or less, about 1.34 or less, about 1.33 or less, about 1.32 or less, about 1.31 or less, about 1.30 or less, about 1.29 or less, about 1.28 or less, about 1.27 or less, about 1.26 or less, about 1.25 or less, about 1.24 or less, about 1.23 or less, about 1.22 or less, about 1.21 or less, about 1.2 or less, about 1.19 or less, about 1.18 or less, about 1.17 or less, about 1.16 or less, about 1.15 or less, about 1.14 or less, about 1.13 or less, about 1.12 or less, about 1.11 or less, about 1.1 or less, about 1.09 or less, about 1.08 or less, about 1.07 or less, or about 1.06 or less. By adjusting the ratio, it is possible to ensure the desired performance of the polarizing plate.

The term shrinkage force referred to herein is a value obtained by measuring in the manner described in an example of this specification.

In the structure, the polarizing plate of the present application may also have shrinkage force of the entire polarizing plate in the direction parallel to the light absorption axis in a range of 6.5N to 15N. In another example, the shrinkage force may be about 6.6N or more, 6.7N or more, 6.8N or more, 6.9N or more, 7N or more, 7.1N or more, 7.2N or more, 7.3N or more, 7.4N or more, 7.5N or more, 7.6N or more, or 7.7N or more, or may be 14.9N or less, 14.8N or less, 14.7N or less, 14.6N or less, 14.5N or less, 14.4N or less, 14.3N or less, 14.2N or less, 14.1N or less, 14N or less, 13.9N or less, 13.8N or less, 13.7N or less, 13.6N or less, 13.5N or less, 13.4N or less, 13.3N or less, 13.2N or less, 13.1N or less, 13N or less, 12.9N or less, 12.8N or less, 12.7N or less, 12.6N or less, 12.5N or less, 12.4N or less, 12.3N or less, 12.2N or less, 12.1N or less, 12N or less, 11.9N or less, 11.8N or less, 11.7N or less, 11.6N or less, 11.5N or less, 11.4N or less, 11.3N or less, 11.2N or less, 11.1N or less, 11N or less, 10.9N or less, 10.8N or less, 10.7N or less, 10.6N or less, 10.5N or less, 10.4N or less, 10.3N or less, 10.2N or less, 10.1N or less, 10N or less 9.9N or less, 9.8N or less, 9.7N or less, 9.6N or less, 9.5N or less, 9.4N or less, 9.3N or less, 9.2 N or less, 9.1N or less, 9N or less, 8.9N or less, 8.8N or less, 8.7N or less, 8.6N or less, 8.5N or less, 8.4N or less, 8.3N or less, 8.2N or less, or 8.1N or less. By adjusting the shrinkage force in the light absorption axis direction as above, it is possible to ensure the desired performance of the polarizing plate.

In the structure, the polarizing plate of the present application may also have shrinkage force of the entire polarizing plate in the direction perpendicular to the light absorption axis in a range of 6N to 15N. In another example, the shrinkage force may be about 6.1N or more, about 6.2N or more, about 6.3N or more, about 6.4N or more, about 6.5N or more, 6.6N or more, 6.7N or more, 6.8N or more, 6.9N or more, 7N or more, 7.1N or more, or 7.2N or more, or may be 14.9N or less, 14.8N or less, 14.7N or less, 14.6N or less, 14.5N or less, 14.4N or less, 14.3N or less, 14.2N or less, 14.1N or less, 14N or less, 13.9N or less, 13.8N or less, 13.7N or less, 13.6N or less, 13.5N or less, 13.4N or less, 13.3N or less, 13.2N or less, 13.1N or less, 13N or less, 12.9N or less, 12.8N or less, 12.7N or less, 12.6N or less, 12.5N or less, 12.4N or less, 12.3N or less, 12.2N or less, 12.1N or less, 12N or less, 11.9N or less, 11.8N or less, 11.7N or less, 11.6N or less, 11.5N or less, 11.4N or less, 11.3N or less, 11.2N or less, 11.1N or less, 11N or less, 10.9N or less, 10.8N or less, 10.7N or less, 10.6N or less, 10.5N or less, 10.4N or less, 10.3N or less, 10.2N or less, 10.1N or less, 10N or less, 9.9N or less, 9.8N or less, 9.7N or less, 9.6N or less, 9.5N or less, 9.4N or less, 9.3N or less, 9.2N or less, 9.1N or less, 9N or less, 8.9N or less, 8.8N or less, 8.7N or less, 8.6N or less, 8.5N or less, 8.4N or less, 8.3N or less, 8.2N or less, or 8.1N or less. By adjusting the shrinkage force in the direction perpendicular to the light absorption axis direction as above, it is possible to ensure the desired performance of the polarizing plate.

However, the polarizing plate has a multilayered structure comprising at least the protective film, the polarizing film and the pressure-sensitive adhesive layer as described above, and among these, at least the protective film and the polarizing film are often stretched films made from different materials, so that it is an uneasy task to ensure such characteristics for the entire polarizing plate.

In the present application, it has been confirmed that by controlling the shrinkage force of the protective film in consideration of the shrinkage force of the polarizing film included in the polarizing plate, in particular, the shrinkage force in the light absorption axis direction, the characteristics of the entire polarizing plate can be maintained as mentioned above.

For example, in order to achieve the characteristics, as the protective film, a film, in which the shrinkage force in any in-plane first direction is in the range of 5N to 10N, is applied, wherein the first direction may be included in the polarizing plate so as to be approximately perpendicular to the light absorption axis direction of the polarizing film.

When the protective film referred to herein is a stretched polymer film, the in-plane first direction of the protective film may be any one of MD (machine direction) and TD (transverse direction) directions and the second direction may be the other of MD (machine direction) and TD (transverse direction) directions.

Thus, the first and second directions may be approximately perpendicular to each other. The perpendicularity referred to herein may mean a case where the relevant angle is in the range of about 80 degrees to 100 degrees. In another example, the angle meaning the perpendicularity may be approximately 82 degrees or more or so, 84 degrees or more or so, 86 degrees or more or so, 88 degrees or more or so, or 90 degrees or more or so, or may be 98 degrees or less or so, 96 degrees or less or so, 94 degrees or less or so, 92 degrees or less or so, or 90 degrees or less or so.

In another example, the shrinkage force of the protective film in the first direction may be about 5.5N or more, about 6N or more, or about 6.5N or more, or may also be about 9.5N or less, about 9N or less, about 8.5N or less, or about 8N or less or so.

In one example, the first direction of the protective film referred to herein may be the TD direction and simultaneously the in-plane direction of the protective film disposed so as to be approximately perpendicular to the light absorption axis of the polarizing film in the polarizing plate.

Furthermore, as the protective film, a protective film, in which the in-plane shrinkage force in the second direction approximately perpendicular to the first direction is in the range of about 0.05N to 4N, can be applied. As described above, this second direction may be the in-plane direction of the protective film disposed so as to be approximately parallel to the light absorption axis of the polarizing film, and also the MD (machine direction) direction.

In another example, the shrinkage force of the protective film in the second direction may be about 0.1N or more, about 0.15N or more, or about 0.2N or more, or may also be about 3.5N or less, about 3N or less, about 2.5N or less, about 2N or less, about 1.5 N or less, about 1N or less, or about 0.5N or less or so.

In the polarizing plate, a ratio (S1/S2) of the shrinkage force (S1) of the protective film in the first direction and the shrinkage force (S2) in the second direction may be in a range of 15 to 45. In another example, the ratio (S1/S2) may be about 16 or more, about 17 or more, about 18 or more, about 19 or more, about 20 or more, about 21 or more, or about 22 or more, or may be about 44 or less, about 43 or less, about 42 or less, about 41 or less, about 40 or less, about 39 or less, about 38 or less, about 37 or less, about 36 or less, about 35 or less, about 34 or less, or about 33 or less or so.

In the polarizing plate, a ratio (SPro/SPVA) of the shrinkage force (SPVA) of the polarizing film in the light absorption axis direction and the shrinkage force (SPro) of the protective film may be in a range of 0.1 to 5. In another example, the ratio may be about 0.2 or more, 0.3 or more, 0.4 or more, 0.45 or more, 0.5 or more, about 0.55 or more, about 0.6 or more, about 0.65 or more, or about 0.7 or more, or may be about 4.5 or less, 4 or less, 3.5 or less, 3 or less, 2.5 or less, 2 or less, or 1.5 or less or so. Here, the shrinkage force (SPro) of the protective film may be the shrinkage force (S1) in the first direction or the shrinkage force (S2) in the second direction. In one example, the shrinkage force (SPro) of the protective film may be the shrinkage force in the first direction.

In the present application, the protective film having the shrinkage force as above may be applied to a specific position of the polarizing plate to achieve the desired shrinkage force characteristic of the entire polarizing plate. However, it is an uneasy task to select the protective film having such a characteristic. In the present application, it has been confirmed that a stretched PET (polyethyleneterephtalate) film, known as a so-called highly stretched polyester film or the like, as a polymer film having a large mechanical asymmetry property as compared to the conventional case, has characteristics very close to the above-described characteristics.

As such a highly stretched PET (poly(ethylene terephthalate)) film, Toyobo's SRF (super retardation film) film or the like is known.

Therefore, the protective film may be a stretched polyester film.

Usually, the stretched PET film is a uniaxially stretched film with one or more layers produced by melting/extruding a PET-based resin to form a film and stretching it or a biaxially stretched film with one or more layers produced by longitudinal and transverse stretching it after film formation.

The PET-based resin generally means a resin in which 80 mol % or more of repeating units become ethylene terephthalate, which may also comprise other dicarboxylic acid components and diol components. The other dicarboxylic acid component is not particularly limited, but it may include, for example, isophthalic acid, p-beta-oxyethoxy benzoic acid, 4,4'-dicarboxydiphenyl, 4,4'-dicarboxybenzophenone, bis(4-carboxyphenyl)ethane, adipic acid, sebacic acid and/or 1,4-dicarboxycyclohexane, and the like.

The other diol component is not particularly limited, but it may include propylene glycol, butanediol, neopentyl glycol, diethylene glycol, cyclohexanediol, an ethylene oxide adduct of bisphenol A, polyethylene glycol, polypropylene glycol and/or polytetramethylene glycol, and the like.

The dicarboxylic acid component or the diol component may be used in combination of two or more as needed. Also, it may be used in combination with an oxycarboxylic acid such as p-oxybenzoic acid. In addition, as the other copolymerization component, a diol component, or a dicarboxylic acid component containing a small amount of amide bonds, urethane bonds, ether bonds, carbonate bonds, or the like may also be used.

As a method for preparing a PET-based resin, a method of directly polycondensing terephthalic acid, ethylene glycol and/or other dicarboxylic acids or other diols as necessary, a method of transesterifying a dialkyl ester of terephthalic acid and ethylene glycol and/or other dialkyl esters of dicarboxylic acids or other diols as necessary, followed by polycondensation, a method of polycondensing terephthalic acid and/or other ethylene glycol esters of dicarboxylic acids as necessary and/or other diol esters as necessary, and the like are adopted.

For each polymerization reaction, a polymerization catalyst comprising an antimony-based, titanium-based, germanium-based or aluminum-based compound, or a polymerization catalyst comprising a composite compound thereof can be used.

The polymerization reaction conditions may be appropriately selected depending on the monomers used, the catalyst, the reaction apparatus, and the desired resin physical properties, which are not particularly limited, but for example, the reaction temperature is usually about 150° C. to about 300° C., about 200° C. to about 300° C. or about 260° C. to about 300° C. In addition, the reaction pressure is usually from atmospheric pressure to about 2.7 Pa, where the pressure may be reduced in the latter half of the reaction.

The polymerization reaction proceeds by volatilizing leaving reactants such as a diol, an alkyl compound or water.

The polymerization apparatus may also be one which is completed by one reaction tank or connects a plurality of reaction tanks. In this case, the reactants are polymerized while being transferred between the reaction tanks, depending on the degree of polymerization. In addition, a method, in which a horizontal reaction apparatus is provided in the latter half of the polymerization and the reactants are volatilized while heating/kneading, may also be adopted.

After completion of the polymerization, the resin is discharged from the reaction tank or the horizontal reaction apparatus in a molten state, and then, obtained in the form of flakes cooled and pulverized in a cooling drum or a cooling belt, or in the form of pellets tailored after being introduced into an extruder and extruded in a string shape. Furthermore, solid-phase polymerization may be performed as needed, thereby improving the molecular weight or decreasing the low molecular weight component. As the low molecular weight component that may be contained in the PET-based resin, a cyclic trimer component may be exemplified, but the content of such a cyclic trimer component in the resin is usually controlled to 5,000 ppm or less, or 3,000 ppm or less.

The molecular weight of the PET-based resin is usually in a range of 0.45 to 1.0 dL/g, 0.50 to 1.0 dL/g or 0.52 to 0.80 dL/g, when the resin has been dissolved in a mixed solvent of phenol/tetrachloroethane=50/50 (weight ratio) and it has been represented as a limiting viscosity measured at 30° C.

The PET-based resin may contain additives as required. The additive may include a lubricant, an anti-blocking agent, a heat stabilizer, an antioxidant, an antistatic agent, a light stabilizer and an impact resistance improver, and the like. The addition amount thereof is preferably within a range that does not adversely affect the optical properties.

The PET-based resin is used in the form of pellets assembled by an ordinary extruder, for formulation of such additives and film molding to be described below. The size and shape of the pellets are not particularly limited, but they are generally a cylindrical, spherical or flat spherical shape having both height and diameter of 5 mm or less. The PET-based resin thus obtained can be molded into a film form and subjected to a stretching treatment to obtain a transparent and homogeneous PET film having high mechanical strength. The production method thereof is not particularly limited, and for example, the following method is adopted.

Pellets made of the dried PET resin are supplied to a melt extrusion apparatus, heated to a melting point or higher and melted. Next, the melted resin is extruded from the die and quenched and solidified on a rotary cooling drum to a temperature below the glass transition temperature to obtain an un-stretched film in a substantially amorphous state. This melting temperature is determined according to the melting point of the PET-based resin to be used or the extruder, which is not particularly limited, but is usually 250° C. to 350° C. In order to improve planarity of the film, it is also preferred to enhance adhesion between the film and the rotary cooling drum, and an adhesion method by electrostatic application or an adhesion method by liquid coating is preferably adopted. The adhesion method by electrostatic application is usually a method in which linear electrodes are provided on the upper surface side of a film in a direction perpendicular to the flow of the film and a direct current voltage of about 5 to 10 kV is applied to the electrodes to provide static charges to the film, thereby improving the adhesion between the rotary cooling drum and the film. In addition, the adhesion method by liquid coating is a method for improving the adhesion between the rotary cooling drum and the film by uniformly coating a liquid to all or a part (for example, only the portion in contact with both film ends) of the surface of the rotary cooling drum. Both of them may also be used in combination if necessary. The PET-based resin to be used may be mixed with two or more resins, or resins having different structures or compositions, if necessary. For example, it may include using a mixture of pellets blended with a particulate filling material as an anti-blocking agent, an ultraviolet absorbing agent or an antistatic agent, and the like, and non-blended pellets, and the like.

The laminating number of films to be extruded may also be two or more layers, if necessary. For example, it may include that pellets blended with a particulate filling material as an anti-blocking agent and non-blended pellets are prepared and supplied from the other extruder to the same die to extrude a film composed of two kinds and three layers, "blended with filling material/non-blended/blended with filling material," and the like.

The un-stretched film is usually stretched longitudinally at a temperature not lower than the glass transition temperature in the extrusion direction first. The stretching temperature is usually 70° C. to 150° C., 80 to 130° C., or 90 to 120° C. In addition, the stretching ratio is usually 1.1 to 6 times or 2 to 5.5 times. The stretching may be terminated once or divided into more than once as necessary.

The longitudinally stretched film thus obtained may be subjected to a heat treatment thereafter. Then, a relaxation treatment may be performed if necessary. The heat treatment temperature is usually 150° C. to 250° C., 180 to 245° C. or 200 to 230° C. Also, the heat treatment time is usually 1 to 600 seconds or 1 to 300 seconds or 1 to 60 seconds.

The temperature of the relaxation treatment is usually 90 to 200° C. or 120 to 180° C. Also, the amount of relaxation is usually 0.1 to 20% or 2 to 5%. The relaxation treatment temperature and the relaxation amount can be set so that a heat shrinkage rate of the PET film after relaxation treatment at 150° C. is 2% or less.

In the case of obtaining uniaxially stretched and biaxially stretched films, transverse stretching is usually performed by a tenter after the longitudinal stretching treatment or after the heat treatment or relaxation treatment, if necessary. The stretching temperature is usually 70° C. to 150° C., 80° C. to 130° C., or 90° C. to 120° C. In addition, the stretching ratio is usually 1.1 to 6 times or 2 to 5.5 times. Thereafter, the heat treatment and, if necessary, the relaxation treatment can be performed. The heat treatment temperature is usually 150° C. to 250° C. or 180° C. to 245° C. or 200 to 230° C. The heat treatment time is usually 1 to 600 seconds, 1 to 300 seconds, or 1 to 60 seconds.

The temperature of the relaxation treatment is usually 100 to 230° C., 110 to 210° C. or 120 to 180° C. Also, the relaxation amount is usually 0.1 to 20%, 1 to 10%, or 2 to 5%. The relaxation treatment temperature and the relaxation amount can be set so that the heat shrinkage rate of the PET film after the relaxation treatment at 150° C. is 2% or less.

In uniaxial stretching and biaxial stretching treatments, in order to alleviate deformation of the orientation main axis as represented by bowing, the heat treatment can be performed again or the stretching treatment can be performed after the transverse stretching. The maximum value of deformation in the orientation main axis by bowing with respect to the stretching direction is usually within 45 degrees, within 30 degrees, or within 15 degrees. Here, the stretching direction also refers to a stretching large direction in longitudinal stretching or transverse stretching.

In the biaxial stretching of the PET film, the transverse stretching ratio is usually slightly larger than the longitudinal stretching ratio, where the stretching direction refers to a direction perpendicular to the long direction of the film. Also, the uniaxial stretching is usually stretched in the transverse direction as described above, where the stretching direction equally refers to a direction perpendicular to the long direction.

The orientation main axis refers to a molecular orientation direction at any point on the stretched PET film. Furthermore, the deformation of the orientation main axis with respect to the stretching direction refers to an angle difference between the orientation main axis and the stretching direction. In addition, the maximum value thereof refers to a maximum value of the values on the vertical direction with respect to the long direction. The method of identifying the orientation main axis is known, and for example, it can be measured using a retardation film/optical material inspection apparatus RETS (manufactured by Otsuka Densi KK) or a molecular orientation system MOA (manufactured by Oji Scientific Instruments).

Such a highly stretched polyester film exhibits characteristics close to the protective film that can achieve the desired shrinkage force characteristics in the present application, but cannot achieve the desired shrinkage force characteristics in the present application on its own. In the present application, it has been confirmed that when a predetermined heat treatment is performed on the highly stretched polyester film to adjust its characteristics, the desired characteristics as described above are secured. That is, the shrinkage force characteristics, tensile properties, and the like of the protective film as described above can be secured by performing heat treatment on the highly stretch polyester film. For example, the shrinkage force of the polymer film may be reduced through heat treatment at a predetermined range of temperature based on the glass transition temperature (Tg) of the relevant film. For example, when the glass transition temperature of the relevant protective film is set as Tg (unit: ° C.), the heat treatment is performed at a temperature within the range of Tg−60 (° C.) to Tg+50 (° C.), whereby the shrinkage force or the like can be adjusted to the desired range. In this case, generally, the shrinkage force is controlled in the TD (transverse direction) direction rather than the so-called MD (machine direction) direction.

In another example, the heat treatment temperature may be Tg+45° C. or less, Tg+40° C. or less, Tg+35° C. or less, Tg+30° C. or less, Tg+25° C. or less, Tg+20° C. or less, Tg+15° C. or less, Tg+10° C. or less, Tg+5° C. or less, Tg° C. or less, Tg−5° C. or less, Tg−10° C. or less, Tg−15° C. or less, Tg−20° C. or less, Tg−25° C. or less, Tg−30° C. or less, or Tg−35° C. or less or so, or may be Tg−55° C. or more, Tg−50° C. or more, Tg−45° C. or more, or Tg−40° C. or more, wherein Tg is the glass transition temperature.

In the present application, it has been confirmed that the desired characteristics can be secured by performing heat treatment at such a temperature on the highly stretched polyester film. Considering the desired characteristics, the time for which the heat treatment is performed can be adjusted without particular limitation, and it may be generally performed within the range of about 10 seconds to 1,000 seconds. In another example, the heat treatment time may be about 15 seconds or more, about 20 seconds or more, about 25 seconds or more, or about 30 seconds or more, or may also be about 900 seconds or less, about 850 seconds or less, about 800 seconds or less, about 750 seconds or less, about 700 Seconds or less, about 650 seconds or less, about 600 seconds or less, about 550 seconds or less, about 500 seconds or less, about 450 seconds or less, about 400 seconds or less, about 350 seconds or less, about 300 seconds or less, about 250 seconds or less, about 200 seconds or less, about 150 seconds or less, about 100 seconds or less, or about 90 seconds or less or so.

The thickness of the protective film applied in the present application may usually be in a range of about 20 μm to 250 μm. In another example, the thickness may be about 200 μm or less, 150 μm or less, or 100 μm or less, or may be about 30 μm or more, 40 μm or more, 50 μm or more, 60 μm or more, or 70 μm or more or so.

The protective film used in the present application may have known functional layers such as an antiglare layer, a conductive layer, a hard coating layer, a smoothing layer, an anti-blocking layer, a primer layer and/or an antireflection layer.

As the polarizing film in the present application, a polarizing film in which a light absorption axis is formed along one in-plane direction can be used. Such polarizing films are variously known. In one example, as the polarizing film, a poly(vinyl alcohol) (hereinafter, PVA)-based polarizing film, which is a typical linear absorption polarizing film, can be used. Such a polarizing film usually comprises a PVA film and an anisotropic absorbent material adsorbed and oriented on the PVA film. As the anisotropic absorbent material, various dichroic dyes may be used, and iodine-based materials may be typically used. Such a polarizing film is generally referred to as an iodine-based absorbent linear PVA polarizing film.

For example, the PVA-based polarizing plate may be produced by subjecting a PVA-based film to various treatments such as swelling, dyeing, cross-linking and stretching, followed by cleaning and drying processes. As described below, the polarizing film can adjust shrinkage force to a predetermined range, where the shrinkage force can be controlled by adjusting the process conditions in any of the processes. In general, the shrinkage force may be influenced by draw ratios or the like during the stretching process of the processes. That is, when the draw ratio is high, the shrinkage force may be high, and when the draw ratio is low, it may be low. However, this method corresponds to one direction in which the shrinkage force can be controlled, and those skilled in the field of manufacturing the polarizing film can easily produce a polarizing film having a desired shrinkage force according to the purpose.

The polarizing film of the present application is the iodine-base absorption linear PVA polarizing film, which may comprise a PVA-based film and an anisotropic absorbent material adsorbed and oriented on the PVA-based film.

As the PVA-based film, for example, a general PVA-based film used in the conventional polarizing film may be used. A material of such a PVA-based film may include PVA or a derivative thereof. The derivative of PVA may include polyvinylformal or polyvinyl acetal, and the like, and may also include those modified by olefins such as ethylene or propylene, unsaturated carboxylic acids such as acrylic acid, methacrylic acid or crotonic acid and alkyl esters thereof or acrylamide, and the like. The PVA has a polymerization degree of about 100 to 10000 or so or about 1000 to 10000 or so, and a saponification degree of about 80 mol % to 100 mol % or so, but is not limited thereto.

The PVA-based film can also be exemplified by a hydrophilic polymer film such as a partially saponified film of ethylene-vinyl acetate copolymer series, a polyene-based oriented film such as a dehydrated product of PVA or a dehydrochlorinated product of polyvinyl chloride, and the like.

The PVA-based film may contain an additive such as a plasticizer or a surfactant. The plasticizer may be exemplified by polyol and a condensate thereof, and for example, may be exemplified by glycerin, diglycerin, triglycerin, ethylene glycol, propylene glycol or polyethylene glycol, and the like. When such a plasticizer is used, the ratio thereof is not particularly limited and may be generally approximately 20 weight % or less in the PVA-based film.

The kind of the anisotropic absorbent material that can be included in the polarizing film is also not particularly limited. In the present application, among the known anisotropic absorbent materials, those capable of satisfying the above-described optical characteristics can be appropriately selected. An example of the anisotropic absorbent material can be exemplified by iodine. The ratio of the anisotropic absorbent material in the polarizing film is also not particularly limited as long as it can satisfy the desired physical properties.

The polarizing film can be produced, for example, by performing at least dyeing, cross-linking and stretching processes on the PVA-based film.

In the dyeing process, an anisotropic absorbent material such as iodine can be adsorbed and/or oriented on the PVA-based film. Such a dyeing process can be performed together with the stretching process. The dyeing can generally be carried out by immersing the film in a solution containing an anisotropic absorbent material, for example, an iodine solution. As the iodine solution, for example, an aqueous solution in which iodine ions are contained by iodine and an iodinated compound as a solubilizing agent may be used. Here, as the iodinated compound, for example, potassium iodide, lithium iodide, sodium iodide, zinc iodide, aluminum iodide, lead iodide, copper iodide, barium iodide, calcium iodide, tin iodide or titanium iodide, and the like can be used. The concentrations of iodine and/or iodide ions in the iodine solution can be controlled within a conventional range according to the purpose. In the dyeing process, the temperature of the iodine solution is usually 20° C. to 50° C. or 25° C. to 40° C. or so, and the immersion time is usually 10 seconds to 300 seconds or 20 seconds to 240 seconds or so, without being limited thereto.

The cross-linking process carried out in the production procedure of the polarizing film can be carried out, for example, using a cross-linking agent such as a boron compound. The order of the cross-linking process is not particularly limited, and the process can be performed, for example, with the dyeing and/or stretching processes, or can proceed separately. The cross-linking process may also be carried out several times. As the boron compound, boric acid or borax may be used. The boron compound can be generally used in the form of an aqueous solution or a mixed solution of water and an organic solvent, and usually an aqueous solution of boric acid is used. The boric acid concentration in the boric acid aqueous solution can be selected in an appropriate range in consideration of the cross-linking degree and the heat resistance thereof. An iodinated compound such as potassium iodide can be contained in an aqueous solution of boric acid or the like.

The treatment temperature of the cross-linking process is usually in a range of 25° C. or higher, 30° C. to 85° C. or 30° C. to 60° C. or so, and the treatment time is usually 5 seconds to 800 seconds or 8 seconds to 500 seconds or so, without being limited thereto.

The stretching process is generally performed by uniaxial stretching. Such stretching may also be performed together with the dyeing and/or cross-linking processes. The stretching method is not particularly limited, and for example, a wet stretching method can be applied. In such a wet stretching method, for example, stretching after dyeing is generally carried out, but stretching may be carried out together with cross-linking, and may be carried out several times or in multiple stages.

The iodinated compound such as potassium iodide can be contained in the treatment liquid applied to the wet stretching method. In the stretching, the treatment temperature is usually in the range of 25° C. or higher, 30° C. to 85° C., or 50° C. to 70° C. or so, and the treatment time is usually 10 seconds to 800 seconds or 30 seconds to 500 seconds, without being limited thereto.

The total draw ratio in the stretching processes can be controlled in consideration of the orientation characteristics and the like, and the total draw ratio may be about 3 to 10 times, 4 to 8 times, or 5 to 7 times or so based on the original length of the PVA-based film, but is not limited thereto. Here, in the case of involving the stretching even in the swelling process or the like other than the stretching process, the total draw ratio may mean the cumulative draw ratio including the stretching in each process. Such a total draw ratio can be adjusted to an appropriate range in consideration of orientation, workability or stretching cut possibility of the polarizing film, and the like. The shrinkage force can be controlled by controlling the draw ratio, as described above.

In the production process of the polarizing film, in addition to the dyeing, cross-linking and stretching, the swelling process may also be performed before the processes are performed. It is possible to clean contamination of the PVA-based film surface, or an antiblocking agent by swelling, and there is also an effect capable of reducing unevenness such as dyeing deviation by the swelling.

In the swelling process, water, distilled water or pure water, and the like can be usually used. The main component of the relevant treatment liquid is water, and if necessary, a small amount of an iodinated compound such as potassium iodide or an additive such as a surfactant, or alcohol, and the like can be included therein.

The treatment temperature in the swelling process is usually 20° C. to 45° C. or so, or 20° C. to 40° C. or so, but is not limited thereto. Since the swelling deviations can cause dyeing deviations, the process variables can be adjusted so that the occurrence of such swelling deviations is suppressed as much as possible. If necessary, the proper stretching may also be performed in the swelling process. The draw ratio may be 6.5 times or less, 1.2 to 6.5 times, 2 times to 4 times, or 2 times to 3 times, based on the original length of the PVA-based film. The stretching in the swelling process can control the stretching in the stretching process performed after the swelling process to be small and can control so that the stretching failure of the film does not occur.

In the production process of the polarizing film, a metal ion treatment can be performed. Such a treatment is carried out, for example, by immersing the PVA-based film in an aqueous solution containing a metal salt. This allows metal ions to be contained in the polarizer, and in this process, the color tone of the PVA-based polarizing film can also be adjusted by controlling the kind or ratio of the metal ions. As the metal ion that can be applied, metal ions of transition metals such as cobalt, nickel, zinc, chromium, aluminum, copper, manganese or iron can be exemplified, and the color tone can also be adjusted by selecting a proper kind among them.

In the production procedure of the polarizing film, the cleaning process may proceed after dyeing, cross-linking and stretching. Such a cleaning process may be performed by a solution of iodine compound such as potassium iodide, and may also be performed by using water.

This cleaning with water may also be combined with cleaning with the solution of an iodinated compound, where a solution in which liquid alcohols such as methanol, ethanol, isopropyl alcohol, butanol or propanol are blended may also be used.

After passing through such a process, the polarizing film can be produced by performing a drying process. In the drying process, for example, it may be performed at an appropriate temperature for a suitable time in consideration of the moisture content and the like required for the polarizing film, and such conditions are not particularly limited.

The thickness of the polarizing film applied in the present application may usually be within a range of about 5 μm to 25 μm. In another example, the thickness may be about 24 μm or less, 23 μm or less, 22 μm or less, 21 μm or less, 20 μm or less, 19 μm or less, 18 μm or less, or 17 μm or less, or may be about 6 μm or more, 7 μm or more, 8 μm or more, 9 μm or more, 10 μm or more, 11 μm or more, 12 μm or more, 13 μm or more, 14 μm or more, 15 μm or more, or 16 μm or more or so.

The polarizing film may have shrinkage force in one in-plane direction within a range of about 0.1N to 15N. The one in-plane direction may be, for example, a direction in which the above-described light absorption axis is formed. The shrinkage force may be 14.5 N or less, 14 N or less, 13.5 N or less, 13 N or less, 12.5 N or less, 12 N or less, 11.5 N or less, 11 N or less, 10.5 N or less, 10 N or less, 10 N or less, 9.5 N or less, or 9 N or less, or may be 0.5 N or more, 1 N or more, 2 N or more, 3 N or more, 4 N or more, 5 N or more, 6 N or more, or 7 N or more.

The polarizing film having the shrinkage force as above can be applied by selecting the polarizing film having the shrinkage force among the available polarizing films or by controlling the process conditions such as the stretching conditions in the production procedure as described above.

Typically, the PVA polarizing film may exhibit shrinkage force in the above-mentioned range in the light absorption axis direction.

The polarizing plate of the present application may comprise a pressure-sensitive adhesive layer, where such a pressure-sensitive adhesive layer may be present for attaching the polarizing plate to a display device such as an LCD or an OLED. The pressure-sensitive adhesive for forming the pressure-sensitive adhesive layer is not particularly limited, and for example, an acrylic polymer, a silicone-based polymer, polyester, polyurethane, polyamide, polyether or a polymer such as a fluorine series or a rubber series as a base polymer can be appropriately selected and used. As described above, with respect to the exposed surface of the pressure-sensitive adhesive layer, a release film may be temporarily attached thereto and covered for the purpose of preventing the contamination until the layer is provided for practical use.

The thickness of the pressure-sensitive adhesive layer may usually be in a range of 5 µm to 100 µm. In another example, the thickness may be about 10 µm or more, 15 µm or more, or 20 µm or more, or may be about 90 µm or less, 80 µm or less, 70 µm or less, 60 µm or less, 50 µm or less, 40 µm or less, or 30 µm or less.

In addition to the above-described elements, the polarizing plate of the present application may comprise other necessary structures as long as the entire thickness is within the desired range.

For example, the polarizing plate may further comprise an adhesive layer between the protective film and the polarizing film. Such an adhesive layer can be used for attaching the protective film to the polarizing film.

As the adhesive, for example, an adhesive layer used for attaching a polarizing film and a protective film in a conventional polarizing plate can be used.

The adhesive layer may comprise one or two or more of, for example, a polyvinyl alcohol-based adhesive; an acrylic adhesive; a vinyl acetate-based adhesive; a urethane-based adhesive; a polyester-based adhesive; a polyolefin-based adhesive; a polyvinyl alkyl ether-based adhesive; a rubber-based adhesive; a vinyl chloride-vinyl acetate-based adhesive; a styrene-butadiene-styrene (SBS) adhesive; a styrene-butadiene-styrene hydrogen adduct (SEBS)-based adhesive; an ethylenic adhesive; and an acrylic ester-based adhesive, and the like. Such an adhesive may be formed using, for example, an aqueous, solvent-based or solventless adhesive composition. In addition, the adhesive composition may be a thermosetting type, room temperature curing type, moisture curing type, active energy ray curing type or hybrid curing type adhesive composition.

A method for forming an adhesive layer on a polarizing film is not particularly limited, and for example, a method of applying an adhesive composition to a polarizing film and curing it, a droplet method, or the like can be used.

The thickness of such an adhesive layer can be, for example, in a range of about 1 µm to 5 µm or about 2 µm to 4 µm.

As a further constitution, the polarizing plate may further comprise a cured resin layer or a protective film between the polarizing film and the pressure-sensitive adhesive layer. Here, the cured resin layer is generally called a hard coating layer, and is generally applied instead of omitting any one of protective films in a polarizing plate. The kind of the cured resin layer that can be applied in the present application is not particularly limited, and various types of cured resin layers used for providing the thin polarizing plate can be applied. Usually, such a cured resin layer may comprise an epoxy resin, an oxetane resin, a urethane resin and/or an acrylic resin, and the like, and such a resin layer is variously known. The thickness of this cured resin layer can be, for example, in a range of about 4 µm to 10 µm or about 4.5 µm to 10 µm.

When a protective film exists between the polarizing film and the pressure-sensitive adhesive layer, a well-known protective film can be used as the relevant protective film. Usually, a thermoplastic resin film having excellent transparency, mechanical strength, thermal stability, moisture barrier property or isotropy and the like is used. An example of such a resin can be exemplified by a cellulose resin such as TAC (triacetyl cellulose), a polyester resin such as PET (poly(ethylene terephthalate)), a polyether sulfone resin, a polysulfone resin, a polycarbonate resin, a polyamide resin, a polyimide resin, a polyolefin resin, a (meth)acrylic resin, a cyclic polyolefin resin such as a norbornene resin, a polyarylate resin, a polystyrene resin, a polyvinyl alcohol resin or a mixture thereof, and the like. The thickness of the protective film may be in the thickness range of the protective film as described above.

Although an appropriate constitution may exist from the cured resin layer and the protective film between the polarizing film and the pressure-sensitive adhesive layer, it is advantageous that the cured resin layer exists from the viewpoint of ensuring the desired shrinkage force characteristics. That is, the cured resin layer is usually a thin layer formed by curing the resin, and thus the shrinkage force characteristics formed by the relationship between the protective film and the polarizing film as mentioned above are not significantly affected, because the physical properties such as shrinkage force or tensile properties are insignificant as compared to the protective film and the degree of influence on the overall characteristics of the polarizing plate is small.

Also, the polarizing plate of the present application may further comprise other known constitutions, for example, one or more functional layers selected from the group consisting of an antireflection layer, an antiglare layer, a retardation plate, a wide view angle compensation film, and/or a brightness enhancement film.

The present application also relates to a display device, and for example, relates to an LCD or OLED. The display device such as the LCD or the OLED may comprise the polarizing plate of the present application. The display device may comprise, for example, a display panel such as an LCD panel or an OLED panel and the polarizing plate of the present application attached to the display panel.

The type of the display panel applicable to the display device of the present application or the position of the polarizing plate attached to the panel, and the like is not particularly limited. That is, the display panel can be realized in various known manners as long as the polarizing plate of the present application is applied.

Usually, the display device, such as the OLED, comprises one polarizing plate for antireflection or the like, and display device, such as the LCD, comprises two polarizing plates on both sides of the display panel (liquid crystal panel). When two polarizing plates are included as such, the relationship between the two polarizing plates may be adjusted to prevent the bending and twisting as mentioned above.

For example, in one example of the present application, the display device comprises the display panel (for example, liquid crystal panel) and first and second polarizing plates attached to both sides of the display panel, wherein the first and second polarizing plates are each a polarizing plate comprising a polarizing film in which a light absorption axis is formed in the above-described one in-plane direction; a protective film formed on one side of the polarizing film and a pressure-sensitive adhesive layer formed on the other side of the polarizing film to attach the polarizing plates to the display panel, which may satisfy Equations 1 and 2 below.

$$-20<16\times(CM-TT)<+30 \quad \text{[Equation 1]}$$

$$-10<9\times(TM-CT)<+30 \quad \text{[Equation 2]}$$

In Equations 1 and 2, CM is shrinkage force of the first polarizing plate in the direction parallel to the light absorption axis direction of the polarizing plate, CT is shrinkage force of the first polarizing plate in the direction perpendicular to the light absorption axis direction of the polarizing plate, TM is shrinkage force of the second polarizing plate in the direction parallel to the light absorption axis direction of the polarizing plate, and TT is shrinkage force of the second polarizing plate in the direction perpendicular to the light absorption axis direction of the polarizing plate.

In another example, 16×(CM−TT) in Equation 1 above may be −19 or more, −18 or more, −17 or more, −16 or more, −15 or more, −14 or more, −13 or more, −12 or more, −11 or more, −10 or more, −9 or more, −8 or more, −7 or more, −6 or more, or −5.5 or more, or may also be 29 or less, 28 or less, 27 or less, 26 or less, 25 or less, 24 or less, 23 or less, 22 or less, 21 or less, 20 or less, 19 or less, 18 or less, 17 or less, 16 or less, 15 or less, 14 or less, 13 or less, 12 or less, 11 or less, 10 or less, 9 or less, or 8.5 or less or so.

In another example, 9×(TM−CT) in Equation 2 above may be −9 or more, −8 or more, −7 or more, −6 or more, −5 or more, −4 or more, or −3 or more, or may also be 29 or less, or 28 or less, 27 or less, 26 or less, 25 or less, 24 or less, 23 or less, 22 or less, 21 or less, 20 or less, 19 or less, 18 or less, 17 or less, 16 or less, 15 or less, 14 or less, 13 or less, 12 or less, 11 or less, 10 or less, 9 or less, 8 or less, 7 or less, 6 or less, or 5 or less or so.

In another example, the display device comprises the display panel (for example, liquid crystal panel) and first and second polarizing plates attached to both sides of the display panel, wherein the first and second polarizing plates are each a polarizing plate comprising a polarizing film in which a light absorption axis is formed in the above-described one in-plane direction; a protective film formed on one side of the polarizing film and a pressure-sensitive adhesive layer formed on the other side of the polarizing film to attach the polarizing plates to the display panel, which may satisfy Equations 3 and 4 below.

$$-10<4\times(CM-TT)<+10 \quad \text{[Equation 3]}$$

$$-5<3\times(TM-CT)<+8 \quad \text{[Equation 4]}$$

In Equations 3 and 4, CM is shrinkage force of the first polarizing plate in the direction parallel to the light absorption axis direction of the polarizing plate, CT is shrinkage force of the first polarizing plate in the direction perpendicular to the light absorption axis direction of the polarizing plate, TM is shrinkage force of the second polarizing plate in the direction parallel to the light absorption axis direction of the polarizing plate, and TT is shrinkage force of the second polarizing plate in the direction perpendicular to the light absorption axis direction of the polarizing plate.

In another example, 4×(CM−TT) in Equation 3 above may be about −9 or more, −8 or more, −7 or more, −6 or more, −5 or more, −4 or more, −3 or more, −2 or more, or −1.5 or more, or may also be 9 or less, 8 or less, 7 or less, 6 or less, 5 or less, 4 or less, 3 or less, or 2.5 or less or so.

In another example, 3×(TM−CT) in Equation 4 above may be about −4 or more, −3 or more, −2 or more, −1.5 or more, or −1 or more, or may also be 7 or less, 6 or less, 5 or less, 4 or less, 3 or less, 2.5 or less, or 2 or less or so.

As the first and second polarizing plates formed on both sides of the display panel satisfy two or more of Equations 1 to 4 above, problems such as bending and twisting may be more effectively prevented.

In one example, the first polarizing plate is a viewing side polarizing plate, which may be a polarizing plate closer to an observer who observes a display screen among the first and second polarizing plates. For example, when the display device is an LCD device, the first polarizing plate of the first and second polarizing plates may be a polarizing plate disposed further away from the backlight than the second polarizing plate, and the second polarizing plate may be a polarizing plate disposed closer to the backlight.

The display device may be an LCD device, where the display panel may be a liquid crystal panel.

In addition, when Equations 1 and 2 above are satisfied, it may be more effective among the above-described contents that the ratio (W/L) of the width (W) to the length (L) in the polarizing film, the polarizing plate or the display panel is in the range of 1.6 to 2. Thus, the polarizing film, the polarizing plate or the display panel has a quadrangle such as a square or a rectangle, where in another example, the ratio (W/L) may be about 1.65 or more, about 1.7 or more, or about 1.75 or more, or may also be about 1.95 or less, about 1.9 or less, about 1.85 or less, or about 1.8 or less.

In addition, when Equations 3 and 4 above are satisfied, it may be more effective among the above-described contents that the ratio (W/L) of the width (W) to the length (L) in the polarizing film, the polarizing plate or the display panel is in the range of 1 to 1.6. Thus, the polarizing film, the polarizing plate or the display panel has a quadrangle such as a square or a rectangle, where in another example, the ratio (W/L) may be about 1.05 or more, about 1.1 or more, about 1.15 or more, about 1.2 or more, or about 1.25 or more, or about 1.3 or more, or may also be about 1.55 or less, about 1.5 or less, about 1.45 or less, about 1.4 or less, or about 1.35 or less.

The configuration of the display device may be performed in a known configuration and manner except for introducing the polarizing plates of the present application so as to satisfy Equations 1 and 2 above or Equations 3 and 4 above.

On the other hand, the above-mentioned first and second polarizing plates may be disposed such that their light absorption axes are perpendicular to each other on both sides of the display panel.

In this case, the first and second polarizing plates may be each a polarizing plate that the small angle of the angles formed by one side of the polarizing film or the polarizing plate as described above and the light absorption axis of the polarizing film is in a range of 0 degrees to 10 degrees or in a range of 80 degrees to 100 degrees, or the small angle of the angles formed by one side of the polarizing film or the polarizing plate and the light absorption axis of the polarizing film is in a range of 35 degrees to 55 degrees or in a range of 125 degrees to 145 degrees.

Advantageous Effects

The present application can provide a polarizing plate having excellent optical and mechanical durability, and without causing bending or twisting when applied to a display device. In the present application, it is possible to provide a polarizing plate exhibiting the above effects even when it is formed in a thin thickness or is applied to a thin display device. In the present application, it is possible to provide a polarizing plate exhibiting the above effects regardless of the size of the polarizing plate or the formation direction of the light absorption axis.

BRIEF DESCRIPTION OF DRAWINGS

FIG. 1 shows an exemplary polarizing plate structure of the present application.

MODE FOR INVENTION

Hereinafter, the present application will be described in detail through Examples and Comparative Examples, but the scope of the present application is not limited by the following Examples.

The term MD referred to herein means the machine direction of the stretched film unless otherwise specified, and the TD means the transverse direction of the stretched film unless otherwise specified.

1. Measurement of Shrinkage Force

The shrinkage force of the polarizing film, the protective film, the optical film or the polarizing plate mentioned herein was measured by the following method using a DMA instrument from TA. A specimen was produced to have a width of about 5.3 mm and a length of about 15 mm, and both ends of the specimen in the longitudinal direction were fixed to the clamp of the measuring instrument and then the contractile force was measured. Here, the length 15 mm of the specimen is the length excluding the portion to be fixed to the clamp. After fixing the specimen to the clamp as above, the specimen was pulled and fixed to maintain strain 0.1% in the state of preload 0N, and then the shrinkage force applied when the strain 0.1% was kept at the elevated temperature of the following temperature condition was measured. As the results of the shrinkage force, values were measured 120 minutes after 80° C. stabilization of the following temperature condition. The shrinkage force was measured at relative humidity maintained at approximately 48% or so.

<Measurement Temperature Condition and Time>
   Temperature: 25° C. start→75° C. after 3 minutes→80° C. stabilization (no acceleration condition) after 7 minutes
   Measurement time: 120 minutes Production Example 1. Production of PVA-Based Polarizing Film (A)

After a PVA (poly(vinyl alcohol)) film (Nippon Synthetic Chemical Co., Ltd., polymerization degree of about 3,000 or so) having a thickness of about 45 µm or so was swelled in a pure solution at a temperature ranging from about 20° C. to 30° C., a dyeing process was performed for about 10 seconds to 30 seconds or so in an iodine solution at a temperature of 30° C. to 40° C. or so. Thereafter, a cleaning process was performed for about 20 seconds with a boric acid solution (concentration: about 2 weight %) at a temperature of about 40° C. or so, and then the film was stretched about 6 times in a boric acid solution at a temperature of 50° C. to 60° C. and a concentration of about 4.0 weight %, and after stretching, a complementary color process was performed in a KI solution at a concentration of about 2 to 4 weight % and dried to produce a polarizing film having a thickness of about 17 µm. As a result of measuring the shrinkage force (hereinafter, MD shrinkage force) of the produced PVA-based polarizing film in the light absorption axis direction, it was approximately 7 to 9N or so.

Production Example 2

Heat Treatment of Protective Film

Toyobo's PET (polyethylene terephthalate) film (product name: SRF, thickness: 80 µm, glass transition temperature: 81° C.) was used as the protective film.

The shrinkage force of the film in the TD direction was 6 to 8N or so, and the shrinkage force in the MD direction was 0.1 to 0.5N or so. The PET film was heat-treated under the conditions shown in Table 1 below and applied as the protective film. The shrinkage force and tensile properties after heat treatment are summarized in Tables 1 and 2 below. In Tables 1 and 2 below, MD and TD are MD (machine direction) and TD (transverse direction) directions of the PET film which is a stretched film, respectively, and 45 is the direction forming 45 degrees with both of the MD and TD directions.

Manufacture of Polarizing Plate (A)

A polarizing plate was produced in the following manner. First, using an epoxy-based ultraviolet curable adhesive (thickness: 2 µm to 3 µm), the PET film was attached to one side of the PVA polarizing film produced in Production Example 1. Upon the attachment, they were attached such that the TD direction of the PET film and the MD direction (light absorption axis direction) of the PVA polarizing film were approximately perpendicular to each other. Subsequently, an epoxy-based hard coating layer was formed to a thickness of about 5 to 7 µm or so on the surface of the PVA polarizing film to which the PET film was not attached. Thereafter, an acrylic pressure-sensitive adhesive layer having a thickness of about 25 µm was formed on the lower part of the hard coating layer to produce a polarizing plate. The shrinkage force of the polarizing plate in the MD and TD directions were summarized and described in Table 3 below. Here, the MD direction is the light absorption axis direction. The polarizing plate had a quadrangular shape, and it was cut such that the angle formed by the long side of the quadrangular polarizing plate and the light absorption axis of the polarizing film was approximately 0 degrees or 90 degrees and used at the time of constructing a display device to be described below.

Production Examples 3 to 7

The polarizing plates of Production Examples 3 to 7 were produced in the same manner as in Production Example 2, except that the heat treatment conditions of the protective film were changed as in Table 1 below and the protective film was applied as the physical properties shown in Table 1 below. Physical properties of the polarizing plates in Production Examples above were summarized and described in Table 2 below.

TABLE 1

| | Shrinkage force after heat treatment of protective film | | Heat treatment conditions of protective film | |
|---|---|---|---|---|
| | MD | TD | Heat treatment temperature | Heat treatment time |
| Production Example 2 | 0.20N | 6.5N | 40° C. | 1 minute |
| Production | 0.25N | 7.4N | 40° C. | 40 seconds |

TABLE 1-continued

|  | Shrinkage force after heat treatment of protective film | | Heat treatment conditions of protective film | |
|---|---|---|---|---|
|  | MD | TD | Heat treatment temperature | Heat treatment time |
| Example 3 | | | | |
| Production Example 4 | 0.35N | 7.9N | 40° C. | 20 seconds |
| Production Example 5 | 0.23N | 2.1N | 100° C. | 1 minute |
| Production Example 6 | 0.20N | 3.1N | 100° C. | 40 seconds |
| Production Example 7 | 0.19N | 4.0N | 100° C. | 20 seconds |

TABLE 2

|  |  | MD shrinkage force (light absorption axis direction) | TD shrinkage force |
|---|---|---|---|
| Production Example 2 | Polarizing plate (A) | 7.73N | 7.29N |
| Production Example 3 | Polarizing plate (B) | 7.79N | 8.05N |
| Production Example 4 | Polarizing plate (C) | 7.9N | 8.09N |
| Production Example 5 | Polarizing plate (D) | 7.79N | 2.2N |
| Production Example 6 | Polarizing plate (E) | 7.79N | 3.51N |
| Production Example 7 | Polarizing plate (F) | 7.79N | 4.2N |

Example 1

The polarizing plate applied in Production Example was applied to an LCD (liquid crystal display) panel (width (W): 1219 mm, length (L): 690 mm) as an upper polarizing plate (viewing side polarizing plate) and a lower polarizing plate (backlight side polarizing plate) to produce a display device. Here, the polarizing plate was cut and used in the same size as the size of the panel, and the attachment was performed with the pressure-sensitive adhesive layer formed on the polarizing plate. As both of the upper and lower polarizing plates, the polarizing plate (B) of Production Example 3 was applied, and the display device was produced by attaching the light absorption axes of both polarizing plates to be perpendicular to each other.

Examples 2 to 6 and Comparative Examples 1 to 9

Display devices were manufactured in the same manner as in Example 1, except that as the upper and lower polarizing plates, those shown in Table 3 below were applied.

TABLE 3

|  |  | Upper polarizing plate | Lower polarizing plate |
|---|---|---|---|
| Example | 1 | Production Example 3 (polarizing plate (B)) | Production Example 3 (polarizing plate (B)) |
|  | 2 | Production Example 3 (polarizing plate (B)) | Production Example 4 (polarizing plate (C)) |
|  | 3 | Production Example 4 (polarizing plate (C)) | Production Example 3 (polarizing plate (B)) |
|  | 4 | Production Example 2 (polarizing plate (A)) | Production Example 2 (polarizing plate (A)) |
|  | 5 | Production Example 2 (polarizing plate (A)) | Production Example 3 (polarizing plate (B)) |
|  | 6 | Production Example 3 (polarizing plate (B)) | Production Example 2 (polarizing plate (A)) |
| Comparative Example | 1 | Production Example 6 (polarizing plate (E)) | Production Example 6 (polarizing plate (E)) |
|  | 2 | Production Example 7 (polarizing plate (F)) | Production Example 7 (polarizing plate (F)) |
|  | 3 | Production Example 5 (polarizing plate (D)) | Production Example 5 (polarizing plate (D)) |
|  | 4 | Production Example 6 (polarizing plate (E)) | Production Example 7 (polarizing plate (F)) |
|  | 5 | Production Example 6 (polarizing plate (E)) | Production Example 5 (polarizing plate (D)) |
|  | 6 | Production Example 7 (polarizing plate (F)) | Production Example 6 (polarizing plate (E)) |
|  | 7 | Production Example 7 (polarizing plate (F)) | Production Example 5 (polarizing plate (D)) |
|  | 8 | Production Example 5 (polarizing plate (D)) | Production Example 7 (polarizing plate (F)) |
|  | 9 | Production Example 5 (polarizing plate (D)) | Production Example 6 (polarizing plate (E)) |

Test Example 1

Flatness (initial flatness) of each display device manufactured in Examples or Comparative Examples was measured. Thereafter, the display device was put into a chamber at a temperature of 60° C. for 72 hours, and then taken out, and the flatness after 2 hours and 24 hours was measured and summarized in Table 4 below. The term flatness is a difference between a portion that is bent most toward the upper polarizing plate and a portion that is bent most toward the lower polarizing plate in the display panel, where this flatness can be confirmed using a known three-dimensional measuring instrument (Dukin Co., Ltd.).

TABLE 4

|  |  | Initial | After 2 hours | | After 6 hours | |
|---|---|---|---|---|---|---|
|  |  | Flatness | Flatness | Variation | Flatness | Variation |
| Example | 1 | 0.2 | 2.1 | 1.9 | 2.2 | 2.0 |
|  | 2 | 0.8 | 2.2 | 1.4 | 2.4 | 1.6 |
|  | 3 | 0.5 | 1.8 | 1.3 | 1.8 | 1.3 |
|  | 4 | 0.7 | 2.4 | 1.7 | 2.5 | 1.8 |
|  | 5 | 0.1 | 2.4 | 2.3 | 2.4 | 2.3 |
|  | 6 | 1.0 | 2.6 | 1.6 | 2.7 | 1.7 |
| Comparative Example | 1 | 1.0 | 9.4 | 8.4 | 9.7 | 8.7 |
|  | 2 | 1.0 | 8.2 | 7.2 | 8.1 | 7.1 |
|  | 3 | 0.6 | 10.8 | 10.2 | 11.2 | 10.6 |
|  | 4 | 0.2 | 8.6 | 8.4 | 8.4 | 8.2 |
|  | 5 | 0.9 | 10.5 | 9.6 | 10.5 | 9.6 |
|  | 6 | 0.4 | 9.1 | 8.7 | 9.5 | 9.1 |
|  | 7 | 0.1 | 10.2 | 10.1 | 10.4 | 10.3 |
|  | 8 | 1.0 | 8.7 | 7.7 | 8.6 | 7.6 |
|  | 9 | 1.0 | 9.7 | 8.7 | 9.7 | 8.7 |

Example 7

The polarizing plate applied in Production Example was applied to an LCD (liquid crystal display) panel (width (W): 813 mm, length (L): 610 mm) as an upper polarizing plate (viewing side polarizing plate) and a lower polarizing plate (backlight side polarizing plate) to produce a display device. Here, the polarizing plate was cut and used in the same size as the size of the panel, and the attachment was performed with the pressure-sensitive adhesive layer formed on the polarizing plate. As both of the upper and lower polarizing plates, the polarizing plate (B) of Production Example 3 was applied, and the display device was produced by attaching the light absorption axes of both polarizing plates to be perpendicular to each other.

Examples 8 to 12 and Comparative Examples 10 to 18

Display devices were manufactured in the same manner as in Example 7, except that as the upper and lower polarizing plates, those shown in Table 5 below were applied.

TABLE 5

| | | Upper polarizing plate | Lower polarizing plate |
|---|---|---|---|
| Example | 7 | Production Example 3 (polarizing plate (B)) | Production Example 3 (polarizing plate (B)) |
| | 8 | Production Example 3 (polarizing plate (B)) | Production Example 4 (polarizing plate (C)) |
| | 9 | Production Example 4 (polarizing plate (C)) | Production Example 3 (polarizing plate (B)) |
| | 10 | Production Example 2 (polarizing plate (A)) | Production Example 2 (polarizing plate (A)) |
| | 11 | Production Example 2 (polarizing plate (A)) | Production Example 3 (polarizing plate (B)) |
| | 12 | Production Example 3 (polarizing plate (B)) | Production Example 2 (polarizing plate (A)) |
| Comparative Example | 10 | Production Example 6 (polarizing plate (E)) | Production Example 6 (polarizing plate (E)) |
| | 11 | Production Example 7 (polarizing plate (F)) | Production Example 7 (polarizing plate (F)) |
| | 12 | Production Example 5 (polarizing plate (D)) | Production Example 5 (polarizing plate (D)) |
| | 13 | Production Example 6 (polarizing plate (E)) | Production Example 7 (polarizing plate (F)) |
| | 14 | Production Example 6 (polarizing plate (E)) | Production Example 5 (polarizing plate (D)) |
| | 15 | Production Example 7 (polarizing plate (F)) | Production Example 6 (polarizing plate (E)) |
| | 16 | Production Example 7 (polarizing plate (F)) | Production Example 5 (polarizing plate (D)) |
| | 17 | Production Example 5 (polarizing plate (D)) | Production Example 7 (polarizing plate (F)) |
| | 18 | Production Example 5 (polarizing plate (D)) | Production Example 6 (polarizing plate (E)) |

Test Example 2

Flatness (initial flatness) of each display device manufactured in Examples or Comparative Examples was measured. Thereafter, the display device was put into a chamber at a temperature of 60° C. for 72 hours, and then taken out, and the flatness after 2 hours and 24 hours was measured and summarized in Table 6 below. Here, the measurement method of the flatness is the same as the case of Test Example 1.

TABLE 6

| | | Initial | After 2 hours | | After 6 hours | |
|---|---|---|---|---|---|---|
| | | Flatness | Flatness | Variation | Flatness | Variation |
| Example | 7 | 0.1 | 1.9 | 1.8 | 1.8 | 1.7 |
| | 8 | 0.9 | 2.1 | 1.2 | 2.2 | 1.3 |
| | 9 | 0.7 | 2.0 | 1.3 | 2.2 | 1.5 |
| | 10 | 1.0 | 2.3 | 1.3 | 2.2 | 1.2 |
| | 11 | 0.5 | 2.1 | 1.6 | 2.4 | 1.9 |
| | 12 | 0.9 | 2.5 | 1.6 | 2.6 | 1.7 |

TABLE 6-continued

| | | Initial | After 2 hours | | After 6 hours | |
|---|---|---|---|---|---|---|
| | | Flatness | Flatness | Variation | Flatness | Variation |
| Comparative Example | 10 | 0.0 | 8.9 | 8.9 | 9.0 | 9.0 |
| | 11 | 0.9 | 8.1 | 7.2 | 8.2 | 7.3 |
| | 12 | 0.9 | 10.1 | 9.2 | 10.2 | 9.3 |
| | 13 | 0.4 | 8.6 | 8.2 | 8.5 | 8.1 |
| | 14 | 0.6 | 10.1 | 9.5 | 10.5 | 9.9 |
| | 15 | 0.3 | 8.9 | 8.6 | 9.1 | 8.8 |
| | 16 | 0.7 | 10.1 | 9.4 | 10.5 | 9.8 |
| | 17 | 0.9 | 8.6 | 7.7 | 8.9 | 8.0 |
| | 18 | 0.1 | 9.4 | 9.3 | 9.1 | 9.0 |

The invention claimed is:

1. A polarizing plate, comprising:
a polarizing film having a light absorption axis formed in one in-plane direction;
a protective film formed on one side of the polarizing film and
a pressure-sensitive adhesive layer formed on the other side of the polarizing film,
wherein a ratio ($S_P/S_V$) of shrinkage force ($S_P$) in the light absorption axis direction relative to shrinkage force ($S_V$) in a direction perpendicular to the light absorption axis direction is from 0.9 to 1.5; the shrinkage force in the direction parallel to the light absorption axis is from 6.5N to 9.4N: the shrinkage force in the direction perpendicular to the light absorption axis is from 6.0N to 9.9N;
a shrinkage force of the polarizing film in the direction parallel to the light absorption axis is from 2N to 15N;
a shrinkage force of the protective film in the direction perpendicular to the light absorption axis is from 5N to 10N, a shrinkage force of the protective film in the direction parallel to the light absorption axis is from 0.05N to 4N,
a ratio (S1/S2) of the shrinkage force (S1) of the protective film in the first direction and the shrinkage force (S2) in the second direction is in a range of 15 to 45;
a ratio ($S_{Pro}/S_{PVA}$) of the shrinkage force ($S_{Pro}$) of the protective film in the direction perpendicular to the light absorption axis relative to the shrinkage force ($S_{PVA}$) of the polarizing film in the direction parallel to the light absorption axis is from 0.1 to 5.

2. The polarizing plate according to claim 1, wherein the polarizing plate has a quadrangular shape and wherein a ratio (W/L) of the width (W) relative to the length (L) of the quadrangular shape is from 1.6 to 2.

3. The polarizing plate according to claim 1, wherein the polarizing plate has a quadrangular shape and wherein a ratio (W/L) of the width (W) relative to the length (L) of the quadrangular shape is from 1 to 1.6.

4. The polarizing plate according to claim 1, wherein the smallest angle among angles formed by one side of the polarizing film and the light absorption axis of the polarizing film is from of 0 to 10 degrees or from 80 to 100 degrees.

5. The polarizing plate according to claim 1, wherein the smallest angle among angles formed by one side of the polarizing film and the light absorption axis of the polarizing film is from 35 to 55 degrees or from of 125 to 145 degrees.

6. The polarizing plate according to claim 1, wherein the shrinkage force of the protective film in the direction perpendicular to the light absorption axis is from 6.5N to 7.9N, the shrinkage force of the protective film in the direction parallel to the light absorption axis is from 0.20N to 0.35N.

7. The polarizing plate according to claim 1, wherein the shrinkage force of the protective film in the direction perpendicular to the light absorption axis is from 6.5N to 7.9N at a width of 5.3 mm, the shrinkage force of the protective film in the direction parallel to the light absorption axis is from 0.20N to 0.35N at a width of 5.3 mm.

8. The polarizing plate according to claim 1, wherein the total thickness of the polarizing plate is 200 μm or less.

9. The polarizing plate according to claim 1, wherein the thickness of the polarizing film is from 5 μm to 25 μm.

10. The polarizing plate according to claim 1, wherein the thickness of the protective film is from 20 μm to 250 μm.

11. The polarizing plate according to claim 1, wherein the thickness of the pressure-sensitive adhesive layer is from 5 μm to 100 μm.

12. A display device, comprising:
a display panel; and
first and second polarizing plates, which are the polarizing plate according to claim 1, attached to both sides of the display panel,
wherein each of the first and second polarizing plates is attached on the display panel via the pressure-sensitive adhesive layer,
wherein each of the first and the second polarizing plates has a quadrangular shape,
wherein the ratio (W/L) of the width (W) relative to the length (L) of the quadrangular shape is from 1.6 to 2, and
wherein the first and the second polarizing plates satisfy Equations 1 and 2 below:

$$-20<16\times(CM-TT)<+30 \qquad \text{[Equation 1]}$$

$$-10<9\times(TM-CT)<+30 \qquad \text{[Equation 2]}$$

wherein, CM is shrinkage force of the first polarizing plate in the direction parallel to the light absorption axis direction of the polarizing plate, CT is shrinkage force of the first polarizing plate in the direction perpendicular to the light absorption axis direction of the polarizing plate, TM is shrinkage force of the second polarizing plate in the direction parallel to the light absorption axis direction of the polarizing plate, and TT is shrinkage force of the second polarizing plate in the direction perpendicular to the light absorption axis direction of the polarizing plate.

13. The display device according to claim 12, wherein the smallest angle among angles formed by one side of the polarizing film in the first and second polarizing plates and the light absorption axis of the polarizing film is from 0 to 10 degrees or from 80 to 100 degrees.

14. The display device according to claim 12, wherein the smallest angle among angles formed by one side of the polarizing film in the first and second polarizing plates and the light absorption axis of the polarizing film is from 35 to 55 degrees or from 125 to 145 degrees.

15. A display device, comprising:
a display panel; and
first and second polarizing plates, which are the polarizing plate according to claim 1, attached to both sides of the display panel,
wherein each of the first and the second polarizing plates is attached on the display panel via the pressure-sensitive adhesive layer,
wherein each of the first and second polarizing plates has a quadrangular shape,
wherein the ratio (W/L) of the width (W) relative to the length (L) is from 1 to 1.6, and
wherein the first and the second polarizing plates satisfy Equations 3 and 4 below:

$$-10<4\times(CM-TT)<+10 \qquad \text{[Equation 3]}$$

$$-5<3\times(TM-CT)<+8 \qquad \text{[Equation 4]}$$

wherein, CM is shrinkage force of the first polarizing plate in the direction parallel to the light absorption axis direction of the polarizing plate, CT is shrinkage force of the first polarizing plate in the direction perpendicular to the light absorption axis direction of the polarizing plate, TM is shrinkage force of the second polarizing plate in the direction parallel to the light absorption axis direction of the polarizing plate, and TT is shrinkage force of the second polarizing plate in the direction perpendicular to the light absorption axis direction of the polarizing plate.

* * * * *

UNITED STATES PATENT AND TRADEMARK OFFICE
CERTIFICATE OF CORRECTION

| | | |
|---|---|---|
| PATENT NO. | : 12,092,849 B2 | Page 1 of 1 |
| APPLICATION NO. | : 17/287310 | |
| DATED | : September 17, 2024 | |
| INVENTOR(S) | : Tae Woo Kim et al. | |

It is certified that error appears in the above-identified patent and that said Letters Patent is hereby corrected as shown below:

On the Title Page

Item [73], should be changed to: Shanjin Optoelectronics (NANJING) Co., Ltd.

Signed and Sealed this
Nineteenth Day of November, 2024

Katherine Kelly Vidal
*Director of the United States Patent and Trademark Office*